(12) United States Patent
Lin et al.

(10) Patent No.: US 12,388,329 B2
(45) Date of Patent: *Aug. 12, 2025

(54) MOTOR AND CONTROL METHOD THEREOF

(71) Applicant: Delta Electronics, Inc., Taoyuan (TW)

(72) Inventors: Yi-Fan Lin, Taoyuan (TW); Li-Jiang Lu, Taoyuan (TW); Chin-Chun Lai, Taoyuan (TW); Chung-Hung Tang, Taoyuan (TW); Chun-Lung Chiu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,067

(22) Filed: May 2, 2024

(65) Prior Publication Data

US 2024/0283309 A1 Aug. 22, 2024

Related U.S. Application Data

(62) Division of application No. 17/733,483, filed on Apr. 29, 2022, now Pat. No. 12,009,697.

(30) Foreign Application Priority Data

Jan. 11, 2022 (CN) .......................... 202220060143.1

(51) Int. Cl.
*H02K 11/215* (2016.01)
*H02K 11/33* (2016.01)
(Continued)

(52) U.S. Cl.
CPC ............ *H02K 11/215* (2016.01); *H02K 11/33* (2016.01); *H02K 29/03* (2013.01); *H02K 1/2746* (2013.01); *H02K 2213/03* (2013.01)

(58) Field of Classification Search
CPC ........ H02K 9/06; H02K 21/24; H02K 21/026; H02K 1/2793; H02K 1/182; H02K 29/03; H02K 1/2746; H02K 11/215; H02K 11/21; H02K 11/33; H02K 7/09; H02K 2213/03; H02K 11/30; Y02T 10/64
(Continued)

(56) References Cited

U.S. PATENT DOCUMENTS 4,409,526 A 10/1983 Yamauchi et al.
7,183,734 B2 2/2007 Lassen
(Continued)

*Primary Examiner* — Alexander A Singh
(74) *Attorney, Agent, or Firm* — KIRTON McCONKIE; Evan R. Witt

(57) ABSTRACT

A motor is provided and driven by two phase. The first and second control signals have a phase difference of 90 degrees and are configured to control the first and second driving units, respectively, and the first and second control signals drive the first and second coil sets, respectively. Each of the first and second poles of the permanent magnet occupies a mechanical angle of 360/2n degrees of the permanent magnet, respectively, and n is 1 or 3. The four sets of the coils of the stator are equally located on the stator, each set of the coil occupies a mechanical angle of 360/2m degrees of the stator, any two sets of the coils adjacent to each other are separated by a mechanical angle of 90–(360/2m) degrees, and m is 3 or 2, wherein m corresponds to 2 when n is 1, m corresponds to 3 when n is 3.

4 Claims, 12 Drawing Sheets

(51) Int. Cl.
*H02K 29/03* (2006.01)
*H02K 1/2746* (2022.01)

(58) Field of Classification Search
USPC .................................. 310/68 B, 68 R, 156.32
See application file for complete search history.

(56) References Cited

U.S. PATENT DOCUMENTS

| | | | |
|---|---|---|---|
| 7,573,226 B2 * | 8/2009 | Takeuchi | H02P 6/16 |
| | | | 318/400.38 |
| 8,004,141 B2 | 8/2011 | Jeung | |
| 8,183,733 B2 | 11/2012 | Jeung | |
| 10,432,079 B2 | 10/2019 | Ny | |
| 2007/0001634 A1 | 1/2007 | Wei et al. | |
| 2011/0304291 A1 | 12/2011 | Jeung | |

* cited by examiner

MOTOR AND CONTROL METHOD THEREOF

CROSS-REFERENCE TO RELATED APPLICATION

This application is a Divisional Application of U.S. patent application Ser. No. 17/733,483 filed on Apr. 29, 2022 and entitled "MOTOR AND CONTROL METHOD THEREO", which claims the priority to Chinese Patent Application No. 202220060143.1 filed on Jan. 11, 2022. The entire contents of the above-mentioned patent applications are incorporated herein by reference for all purposes.

FIELD OF THE INVENTION

The present disclosure relates to a motor and a control method thereof capable of improving the space utilization rate of coils.

BACKGROUND OF THE INVENTION

The motor structure includes a stator and a rotor, wherein the stator includes coils, and the rotor includes a magnetic element. Through the interaction between the coils and the magnetic element, a magnetic field is generated between the stator and the rotor, thereby making the rotor to rotate.

The conventional motor utilizes a 4-slot coil stator with an 8-pole rotor in structure, that is, the stator is formed by 4 independent coils. Each coil occupies a mechanical angle of 45 degrees of the circumference of the stator, which will form a mechanical angle of 22.5 degrees or 67.5 degrees between the adjacent coils. The rotor is a permanent magnet with eight uniform pole faces, and each pole occupies a mechanical angle of 45 degrees. In terms of control, the conventional motor connects the 4 independent coils in series and performs two-phase driving.

Regarding to the structure design of the conventional motor including the 4-slot coil stator and the 8-pole rotor, the space utilization rate of the stator coil is only 50%. Since the space utilization rate of the coil is positively related to the efficiency of the motor, the efficiency of the conventional motor has room for improvement.

Therefore, there is a need of providing a motor and a control method thereof to obviate the drawbacks encountered from the prior arts.

SUMMARY OF THE INVENTION

It is an object of the present disclosure to provide a motor and a control method thereof. The motor and the control method thereof are capable of reducing the ripple of the torque to reduce the vibration of the motor during operation. The space utilization rate of the stator coil is improved, thereby optimizing the efficiency of the motor.

In accordance with an aspect of the present disclosure, there is provided a motor. The motor includes a rotor, a stator and a driving element. The rotor includes a permanent magnet. The permanent magnet includes n first poles and m second poles. The first pole and the second pole have different polarities and are staggered with each other. Each of the first and second poles occupies a mechanical angle of 360/2n degrees of the permanent magnet, respectively, and n is 1 or 3. The stator has four sets of coils. The four sets of coils are equally located on the stator, and each set of the coils occupies a mechanical angle of 360/2m degrees of the stator. Any two sets of coils adjacent to each other are separated by a mechanical angle of 90−(360/2m) degrees, and m is 3 or 2, wherein m corresponds to 2 when n is 1, and m corresponds to 3 when n is 3. The four sets of the coils of the present disclosure are wound in an axial winding shaft, wherein two of the four sets of coils are disposed relative to a center of the stator to form a first coil set. The other two of the four sets of coils are disposed relative to the center of the stator to form a second coil set. A first extension line is formed by passing through a midpoint of any coil of the first coil set and the center of the stator, and a second extension line is formed by passing through the midpoint of any coil of the second coil set and the center of the stator. The angle between the first and second extension lines is a mechanical angle of 90 degrees. In the present disclosure, the midpoint of the coil can be regarded as the winding shaft of the coil axis. The driving element of the motor includes two Hall elements, a first driving unit and a second driving unit. Two Hall elements are configured to sense the change of the magnetic field generated by the passage of the permanent magnet. The first driving unit drives the first coil set according to a first control signal, and the second driving unit drives the second coil set according to a second control signal. The first and second control signals are generated according to the sensing results of the two Hall elements, respectively, and the phase difference between the first and second control signals is 90 degrees in electrical angle.

In an embodiment of the present disclosure, the amount of the Hall element is one, and the Hall element is electrically connected to a logic unit. The logic unit generates a first control signal and a second control signal with a phase difference of 90 degrees in electrical angle after receiving the sensing result of the Hall element. The first and second driving units drive the first coil set and the second coil set according to the first and second control signals, respectively.

In accordance with another aspect of the present disclosure, there is provided a control method of a motor. The motor includes a rotor, a stator and a driving element. The rotor includes a permanent magnet. The permanent magnet includes n first poles and n second poles. The first pole and the second pole have different polarities and are staggered with each other. Each of the first and second poles occupies a mechanical angle of 360/2n degrees of the permanent magnet, respectively, and n is 1 or 3. The stator has four sets of coils equally located on the stator, and each set of the coils occupies a mechanical angle of 360/2m degrees of the stator. Any two sets of the coils adjacent to each other are separated by a mechanical angle of 90−(360/2m) degrees, and m is 3 or 2, wherein m corresponds to 2 when n is 3, and m corresponds to 3 when n is 3. The four sets of coils of the present disclosure are wound in an axial winding shaft, wherein two of the four sets of the coils are disposed relative to a center of the stator to form a first coil set. The other two of the four sets of coils are disposed relative to the center of the stator to form a second coil set. A first extension line is formed by passing through a midpoint of any coil of the first coil set and the center of the stator, a second extension line is formed by passing through the midpoint of any coil of the second coil set and the center of the stator. The angle between the first and second extension lines is a mechanical angle of 90 degrees. The control method includes steps of:

(a) providing a first Hall element and a second Hall element, wherein the first Hall element and the second Hall element are disposed by a mechanical angle of 90 degrees Circumferential angle;

(b) utilizing the first Hall element and the second Hall element to sense the change of the magnetic field generated by the permanent magnet and generating a first control signal and a second control signal with a phase difference of 90 degrees by the first and second Hall elements, respectively; and (c) driving the first coil set and the second coil set according to the first control signal and the second control signal, respectively.

In accordance with another aspect of the present disclosure, there is provided a control method of a motor. By utilizing a Hall element and a logic unit, the same effect by two Hall elements mentioned above is achieved. The logic unit generates a first control signal and a second control signal with a phase difference of 90 degrees in electrical angle according to the sensing result of the Hall element, and the first driving unit and the second driving unit drive the first coil set and the second coil set according to the first control signal and the second control signal, respectively.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
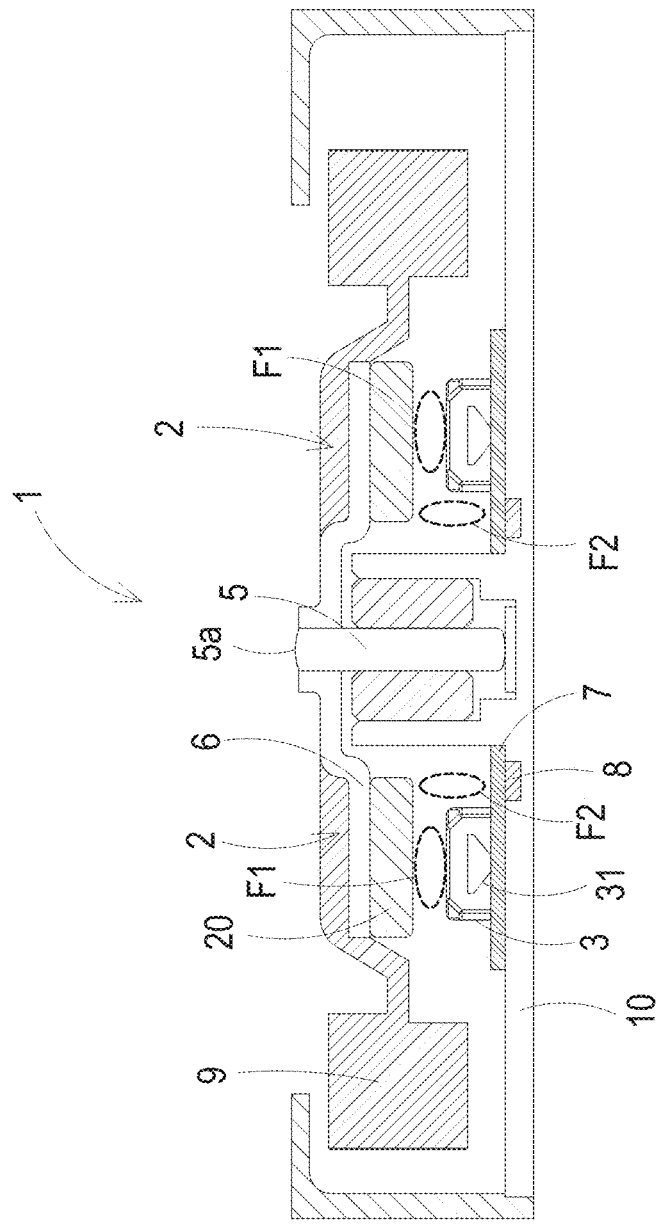
FIG. 1 is a schematic cross-sectional view illustrating a motor according to a first embodiment of the present disclosure.
Figure 2B:
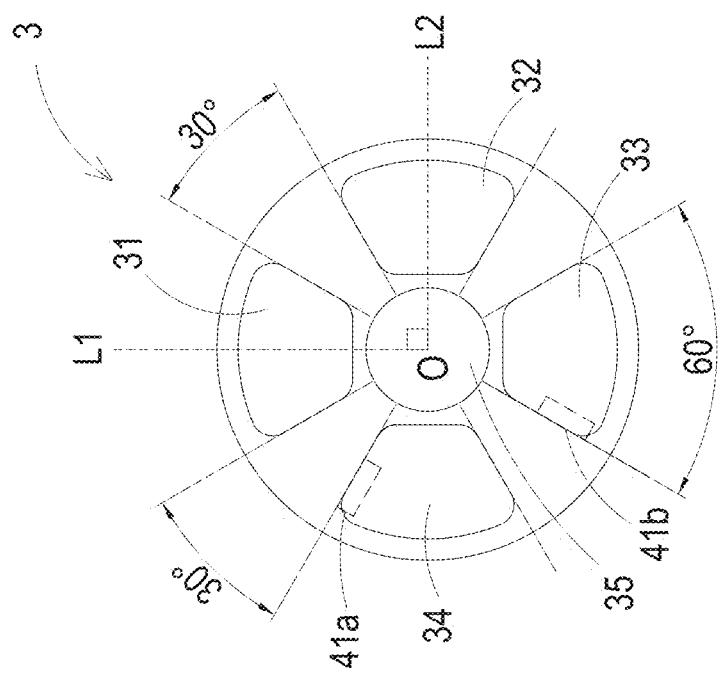
FIG. 2B schematically shows a top view of a stator corresponding to the rotor of the motor of FIG. 2A.
Figure 2A:
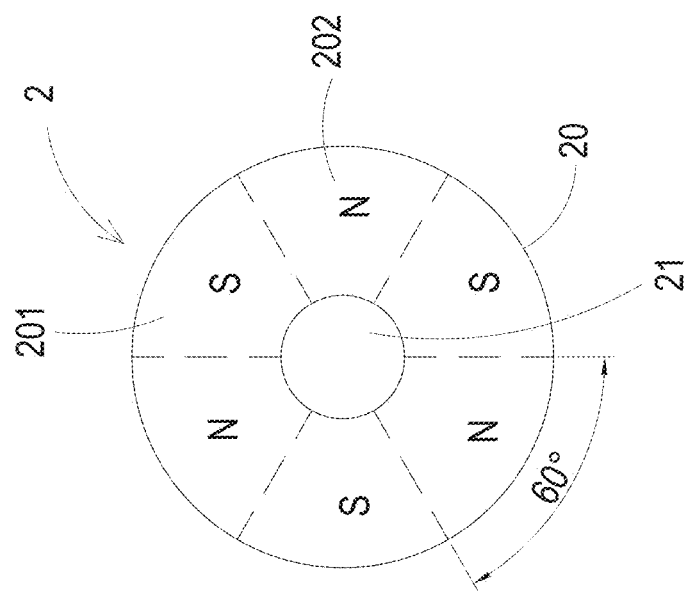
FIG. 2A schematically shows a top view of the rotor of the motor of FIG. 1.
Figure 3B:
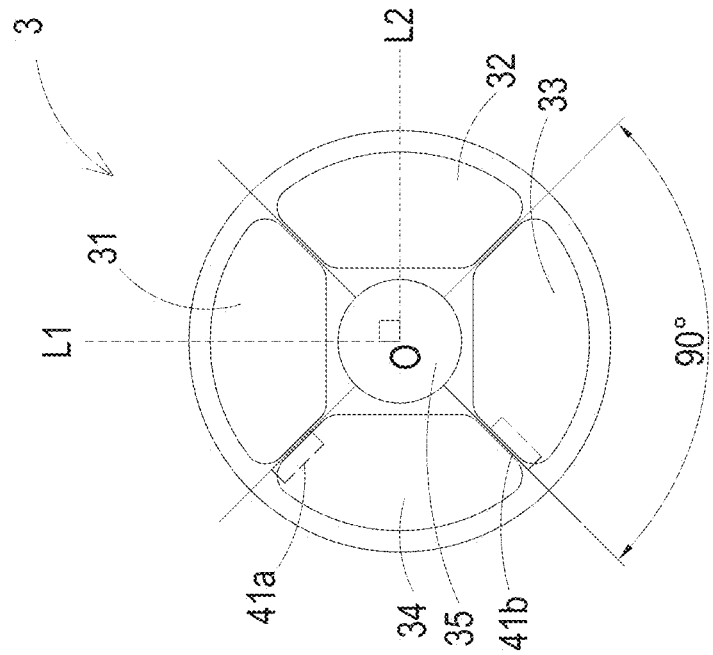
FIG. 3B schematically shows a top view of the stator of the motor of FIG. 1 according to another embodiment of the present disclosure.
Figure 3A:
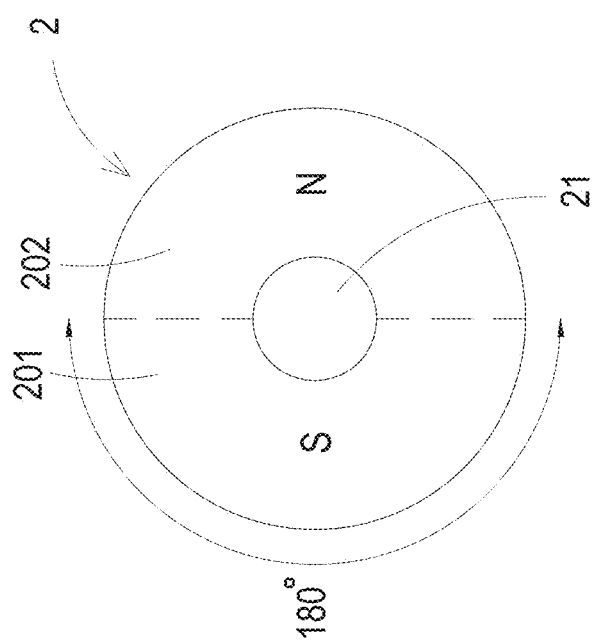
FIG. 3A schematically shows a top view of the rotor of the motor of FIG. 1 according to another embodiment of the present disclosure.
Figure 4:
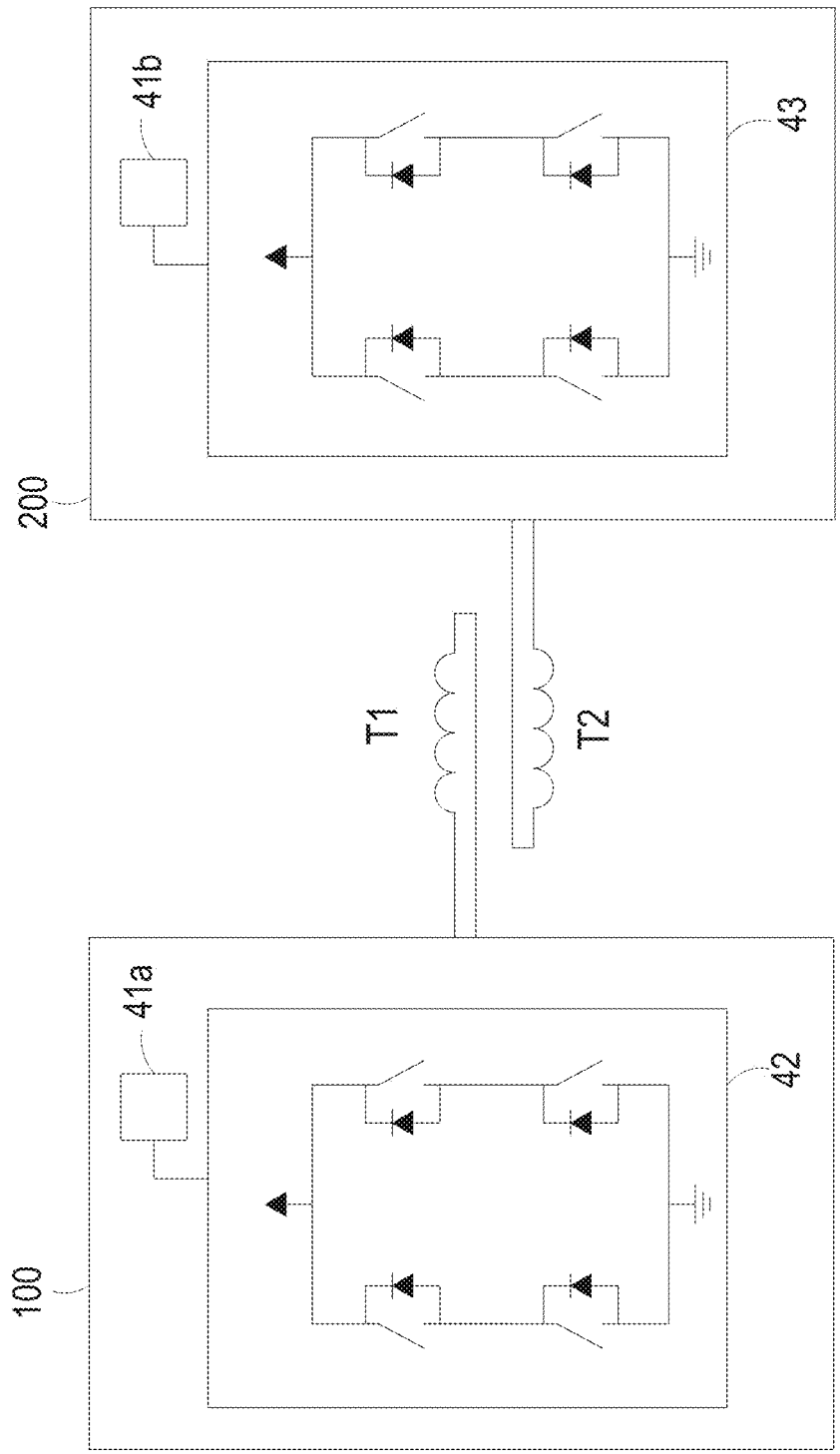
FIG. 4 is a schematic circuit diagram of the motor of FIG. 1.

FIG. 1 is a schematic cross-sectional view illustrating a motor according to a first embodiment of the present disclosure. FIG. 2A schematically shows a top view of the rotor of the motor of FIG. 1. FIG. 2B schematically shows a top view of a stator corresponding to the rotor of the motor of FIG. 2A. FIG. 3A schematically shows a top view of the rotor of the motor of FIG. 1 according to another embodiment of the present disclosure. FIG. 3B schematically shows a top view of the stator of the motor of FIG. 1 according to another embodiment of the present disclosure. FIG. 4 is a schematic circuit diagram of the motor of FIG. 1. As shown in FIGS. 1, 2A, 2B, 3A, 3B and 4, the motor 1 of the present disclosure includes a rotor 2, a stator 3 and a driving element. The rotor 2 includes a permanent magnet 20 having n first poles 201 and n second poles 202. The first poles 201 and the second poles 202 have different polarities and are staggered with each other. Each of the first poles 201 and each of the second poles 202 occupy a mechanical angle of 360/2n degrees of the permanent magnet 20 respectively, where n is 1 or 3. As shown in FIG. 2A, when n is 3, the rotor 2 has three first magnetic poles (S poles) 201 and three second magnetic poles (N poles) 202, and each of the first and second magnetic poles 201, 202 has a mechanical angle of 60 degrees. As shown in FIG. 3A, when n is 1, the rotor 2 has one first magnetic pole (S pole) 201 and one second magnetic pole (N pole) 202, and each of the first and second magnetic poles 201, 202 has a mechanical angle of 180 degrees.

Please refer to FIGS. 1, 2B and 3B again. The stator 3 has four sets of the coils 31, 32, 33 and 34 equally located on the stator 3. In the present disclosure, the coils of the present disclosure are wound around an axial winding shaft. Each set of the coils occupies a mechanical angle of 360/2m degrees of the stator 3. Any two sets of the coils adjacent to each other are separated by a mechanical angle of 90−(360/2m) degrees, and m is 3 or 2, wherein m corresponds to 3 when n is 3, and m corresponds to 2 when n is 1. In FIGS. 2A and 2B, the motor 1 is a 6-pole and 4-slot motor when n is 3, and m is 3. Each set of the coils 31, 32, 33 and 34 occupies a mechanical angle of 60 degrees of the stator 3, and any two sets of the coils adjacent to each other are separated by a mechanical angle of 30 degrees. In FIGS. 3A and 3B, the motor 1 is a 2-pole and 4-slot motor when n is 1, and m is 2. Each set of the coils 31, 32, 33 and 34 occupies a mechanical angle of 90 degrees of the stator 3, and any two sets of the coils adjacent to each other are separated by a mechanical angle of 0 degrees.

Please refer to FIGS. 2B, 3B and 4. In the four sets of the coils 31, 32, 33 and 34, two sets of the coils 31 and 33 opposite to each other are disposed relative to a center O (i.e., the center of circle) of the stator 3 to form a first coil set T1. The coils 31 and 33 are in the same phase. The other two sets of the coils 32 and 34 opposite to each other are disposed relative to a center O of the stator 3 to form a second coil set T2. The coils 32 and 34 are in the same phase. A first extension line L1 is formed by passing through a midpoint of any coil of the first coil set T1 and the center O of the stator 3. FIG. 2B exemplifies the first extension line L1 passing through the midpoint of the coil 31 of the first coil set T1 and the center O of the stator 3. FIG. 3B exemplifies the first extension line L1 passing through the midpoint of the coil 31 of the first coil set T1 and the center O of the stator 3. A second extension line L2 is formed by passing through a midpoint of any coil of the second coil set T2 and the center O of the stator 3. FIG. 2B exemplifies the second extension line L2 passing through the midpoint of the coil 32 of the second coil set T2 and the center O of the stator 3. FIG. 3B exemplifies the second extension line L2 passing through the midpoint of the coil 31 of the second coil set T2 and the center O of the stator 3. According to the definitions of the first extension line L1 and the second extension line L2 defined above, the angle between the first and second extension lines L1, L2 is a mechanical angle of 90 degrees.

Please refer to FIGS. 1, 2B, 3B and 4. The driving element includes Hall elements 41a and 41b, a first driving unit 42 and a second driving unit 43. As shown in FIG. 4, each of the illustrated first driving unit 42 and the second driving unit 43 includes a full-bridge switching circuit, respectively. When the motor 1 of the present disclosure is operating, the Hall elements 41a and 41b are configured to sense the change of the magnetic field generated by the permanent magnet 20 driven by the rotor 2, and generate two sensing signals with a phase difference of 90 degrees in electrical angle sequentially. The controller (not shown) of the driving element generates a first control signal and a second control signal according to the two sensing signals, and controls the first driving unit 42 and the second driving unit 43 to drive the first coil set T1 and the second coil set T2 according to the first control signal and the second control signal, respectively. The first and second control signals have a phase difference of 90 degrees in electrical angle.

Accordingly, the motor 1 of the present disclosure controls the first driving unit 42 and the second driving unit 43 according to the first control signal and the second control signal, respectively, so as to drive the first and second coil sets T1 and T2 of the stator 3, respectively. The first and second control signals have a phase difference of 90 degrees in electrical angle. Each of the first and second poles 201, 202 of the permanent magnet 20 of the rotor 2 occupies a mechanical angle of 360/2n degrees of the permanent magnet 20. The four sets of the coils 31, 32, 33 and 34 occupy a mechanical angle of 360/2m degrees of the stator 3, and any two sets of the coils adjacent to each other are separated by a mechanical angle of 90–(360/2m) degrees. Therefore, when n is 3 and m is 3, the motor 1 of the present disclosure is a 6-pole and 4-slot motor as shown in FIGS. 2A and 2B. When the winding shaft of the coils is in the axial direction and the rotor magnet and the coil are in the axial direction, the space utilization rate of coils is 66.67%. Therefore, compared with the conventional 8-pole and 4-slot motor, the space utilization rate of the motor 1 is increased by 16.67%, and the efficiency of the motor 1 with 6 poles and 4 slots in the present disclosure is also improved correspondingly. When n is 1 and m is 2, the motor 1 of the present disclosure is a 2-pole and 4-slot motor as shown in FIGS. 3A and 3B, and the space utilization rate of coils is close to 100%. Therefore, compared with the conventional 8-pole and 4-slot motor, the space utilization rate is increased by 50%, which can further improve the efficiency.

In the embodiment of the present disclosure, the first and second control signals are generated by two sensing signals with a phase difference of 90 degrees in electrical angle. The first driving unit 42 and the second driving unit 43 drive the first coil set T1 and the second coil set T2 according to the first control signal and the second control signal, respectively. Accordingly, other implementation with the third coil set is excluded.

In the embodiment of present disclosure, the amount of the Hall elements can be two. As shown in FIGS. 2B, 3B and 4, one Hall element 41a is disposed on the first coil set T1 (e.g., on the coil 33 of the first coil set T1 as shown in FIGS. 2B and 3B), and the other Hall element 41b is disposed on the second coil set T2 (e.g., on the coil 34 of the second coil set T2 as shown in FIGS. 2B and 3B). The two Hall elements 41a and 41b are disposed by a mechanical angle of 90 degrees Circumferential angle.

Figure 5:
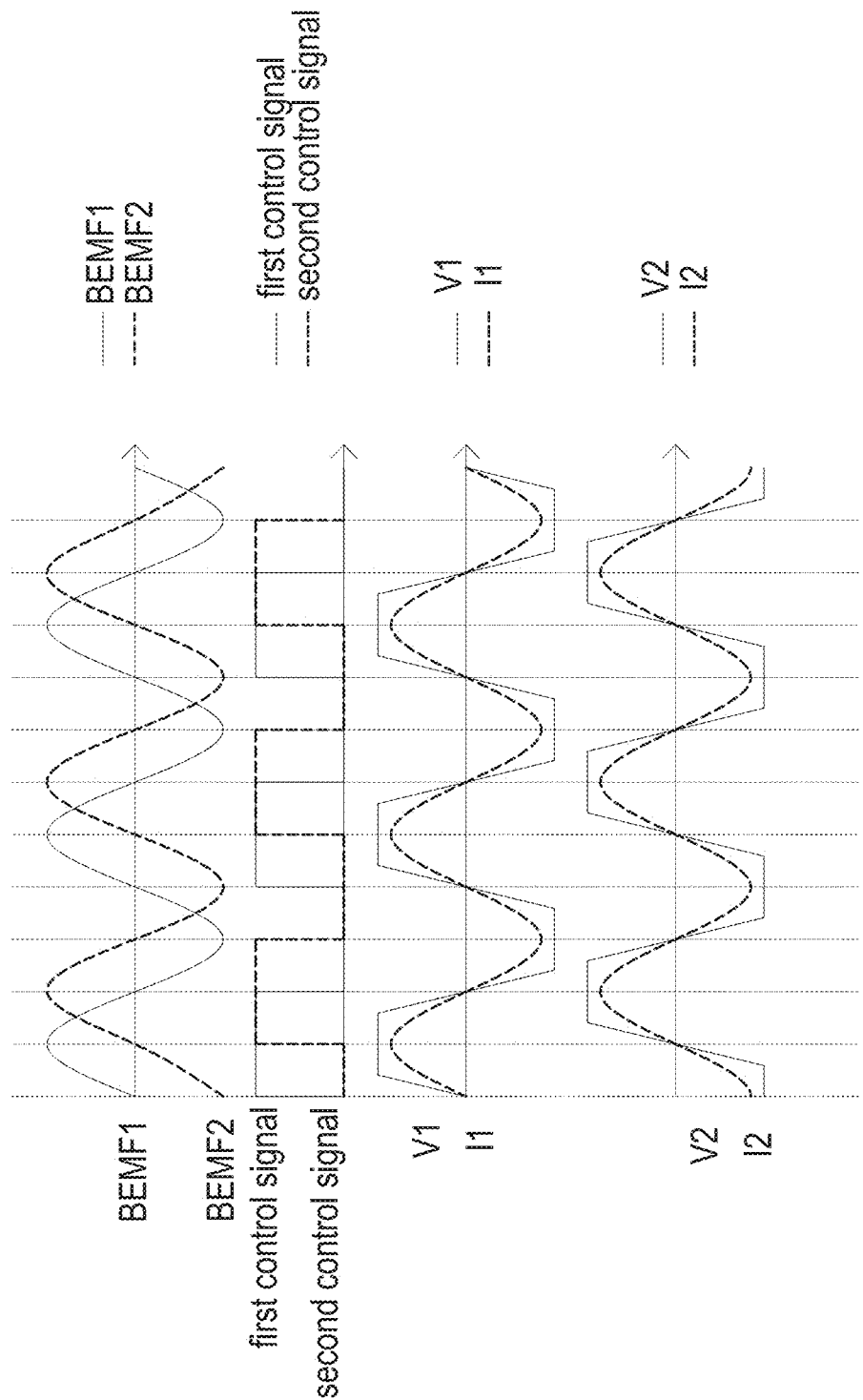
FIG. 5 is a schematic oscillogram of the signals of the motor in FIG. 4.

Please refer to FIGS. 4 and 5. FIG. 5 is a schematic oscillogram of the signals of the motor in FIG. 4. As shown in FIGS. 4 and 5, the Hall element 41a is electrically connected to the first driving unit 42, and the other Hall element 41b is electrically connected to the second driving unit 43. The first driving unit 42 and the Hall element 41a, which are electrically connected to each other, can be integrated into a first integrated circuit 100. The second driving unit 43 and the Hall element 41b, which are electrically connected to each other, can be integrated into a second integrated circuit 200. The first driving unit 42 drives the first coil set T1 according to the first control signal generated by the sensing result of the corresponding Hall element 41a. The second driving unit 43 drives the second coil set T2 according to the second control signal generated by the sensing result of the corresponding Hall element 41b. The first control signal has the same phase as the continuous induction electromotive force BEMF1 generated by the first coil set T1. The second control signal has the same phase as the continuous induction electromotive force BEMF2 generated by the second coil set T2. The driving voltage continuously outputted by the first driving unit 42 is V1, the driving voltage continuously outputted by the second driving unit 43 is V2, and the phase difference between the driving voltage V1 and the driving voltage V2 is 90 degrees in electrical angle. In addition, the current flowing through the first coil set T1 is I1, the current flowing through the second coil set T2 is I2, and the phase difference between the current I1 and the current I2 is 90 degrees in electrical angle. The first control signal can also be regarded as being generated by the first integrated circuit 100, and the second control signal can be regarded as being generated by the second integrated circuit 200.

Figure 6A:
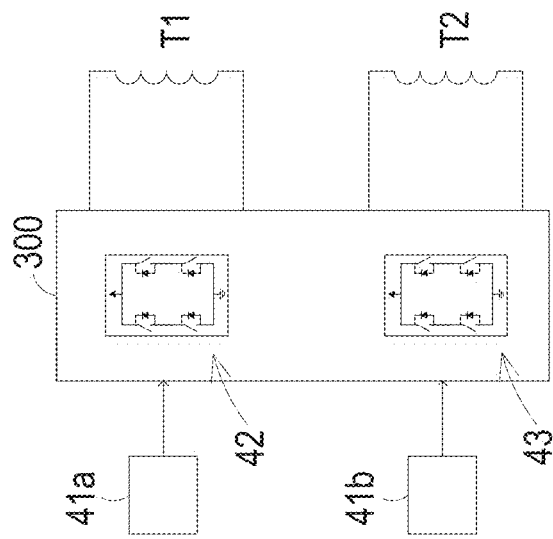
FIGS. 6A to 6D are the structural diagrams of the integrated driving units and Hall elements according to other embodiments of the present disclosure.

The method of integrating the driving unit and the Hall element in the driving element and the amount of the Hall element are not limited to the above. The following examples illustrate the different types of integration methods of the driving unit and the Hall elements and different amounts of the Hall elements. FIGS. 6A to 6D are the structural diagrams of the integrated driving units and Hall elements according to other embodiments of the present disclosure. As shown in FIG. 6A, the first integrated circuit 100 only includes a first driving unit 42, the second integrated circuit 200 only includes a second driving unit 43, and the driving element of the motor 1 includes two Hall elements 41a and 41b. The Hall elements 41a and 41b are electrically connected to the first integrated circuit 100 and the second integrated circuit 200 respectively, that is, the Hall elements 41a and 41b are disposed independently and are not integrated into the first integrated circuit 100 and the second integrated circuit 200, respectively.

Figure 6B:
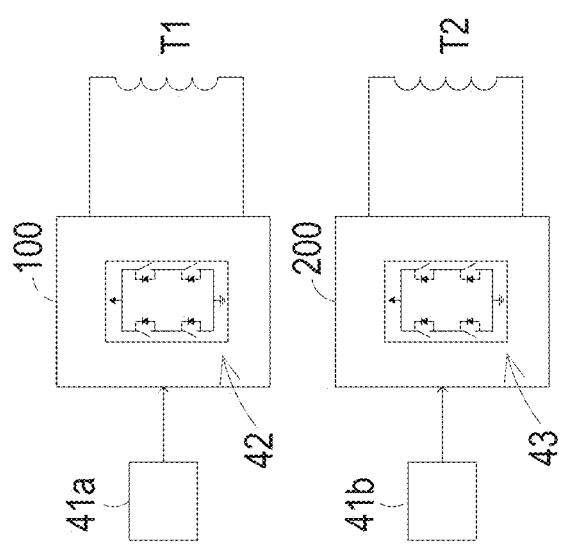

As shown in FIG. 6B, the first driving unit 42 and the second driving unit 43 are integrated into one integrated circuit 300, and the motor 1 includes two Hall elements 41a and 41b. The two Hall elements 41a and 41b are independently disposed outside the integrated circuit 300 and are not integrated into the integrated circuit 300. The two Hall elements 41a and 41b are electrically connected to the integrated circuit 300, and provide the sensing results to the first driving unit 42 and the second driving unit 43 of the integrated circuit 300, respectively.

Figure 6C:
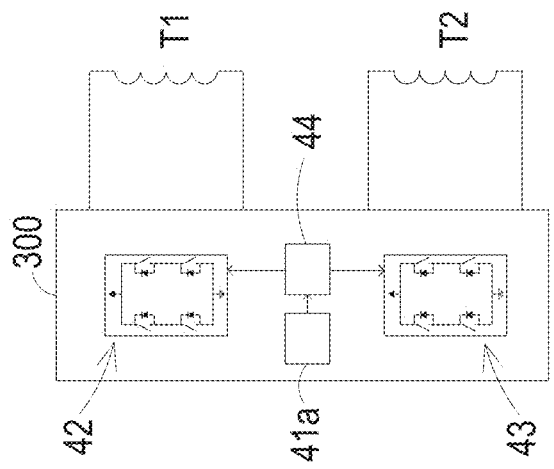

As shown in FIG. 6C, the driving element further includes a logic unit 44. The first driving unit 42, the second driving unit 43 and the logic unit 44 are integrated into the integrated circuit 300. The logic unit 44 is electrically connected to the first driving unit 42 and the second driving unit 43. The motor 1 includes only a Hall element 41a, and the Hall element 41a is independently disposed outside the integrated circuit 300 and is not integrated into the integrated circuit 300. The Hall element 41a is electrically connected to the logic unit 44 of the integrated circuit 300. After the Hall element 41a senses the change of the magnetic pole on the rotor, the logic unit 44 calculates according to the sensing result of the Hall element 41a to generate the first control signal and the second control signal with a phase difference of 90 degrees in electrical angle. The first driving unit 42 and the second driving unit 43 drive the first coil set T1 and the second coil set T2 according to the first control signal and the second control signal, respectively.

Figure 6D:
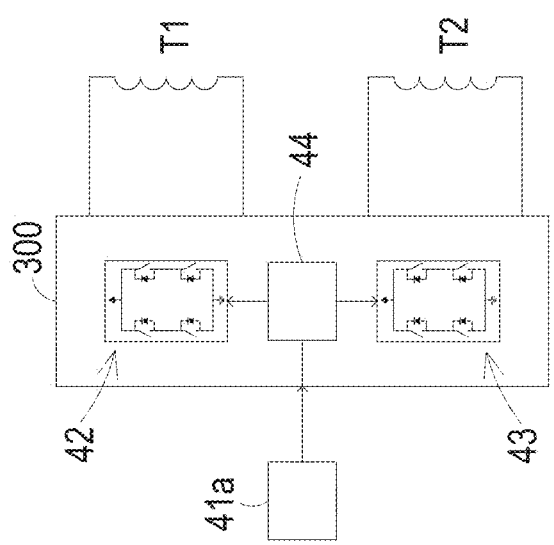

As shown in FIG. 6D, the motor 1 includes a Hall element 41a, and the Hall element 41a, the first driving unit 42, the second driving unit 43 and the logic unit 44 are integrated into the integrated circuit 300. The Hall element 41a is electrically connected to the logic unit 44. After the Hall element 41a senses the change of the magnetic pole on the rotor, the logic unit 44 calculates according to the sensing result of the Hall element 41a to generate the first control signal and the second control signal with a phase difference of 90 degrees in electrical angle. The first driving unit 42 and the second driving unit 43 drive the first coil set T1 and the second coil set T2 according to the first control signal and the second control signal, respectively.

Please refer to FIG. 1. The rotor 2 of the motor 1 is assembled with a fan blade 9 to form a fan, and the motor 1 drives the fan blade 9 to rotate. In addition, the motor 1 includes a shaft 5, a hub 6, a circuit board 7, an annular magnetic conductive element 8, a rotor 2, a stator 3, a base 10 and a driving element. The structures and operations of the rotor 2, the stator 3 and the driving element are as described above, and the detailed descriptions thereof are omitted herein. The base 10 is disposed on the bottom of the motor 1 to carry the structure of the motor 1. The circuit board 7 is disposed on the inner wall surface of the base 10, and the shaft 5 is connected to the hub 6 of the rotor 2 and is connected to the shaft tube of the base 10 through a bearing. The hub 6 is connected to the permanent magnet 20 so that the permanent magnet 20 and the stator coils 31, 32, 33 and 34 are axially opposite to each other. One end of the shaft 5 protrudes from the hub 6 to form a protrusion part 5a, and the protrusion part 5a can increase the stability of the shaft 5 and the hub 6. The shaft 5 penetrates through the through holes 21 of the rotor 2 and the through holes 35 of the stator 3. The rotor 2 and the stator 3 are disposed in an axial direction relative to the shaft 5. When a magnetic field is generated between the stator 3 and the rotor 2, the rotor 2 drives the hub 6 to rotate, and the shaft 5 and the fan blades 9 connected to the hub 6 also rotate synchronously. The driving element is formed on the circuit board 7. The circuit board 7 has a first side and a second side opposite to each other, wherein the first side is closer and faced to the rotor 2 than the second side. The stator 3 is disposed on the first side of the circuit board 7, and the windings of the coils 31, 32, 33 and 34 of the stator 3 are axial winding shaft. A first magnetic circuit F1 is generated between the coils 31, 32, 33 and 34 and the permanent magnet 20 of the rotor 2 in the axial direction, and the rotor 2 rotates through the first magnetic circuit F1.

In FIG. 1, the annular magnetic conductive element 8 is disposed on the second side of the circuit board 7. That is, the annular magnetic conductive element 8 is disposed between the circuit board 7 and the base 10. The annular magnetic conductive element 8 corresponds to the position of the permanent magnet 20 of the rotor 2 in the axial direction. An axial second magnetic circuit F2 is generated between the annular magnetic conductive element 8 and the permanent magnet 20. The second magnetic circuit F2 is located between the shaft 5 and the coils 31, 32, 33, and 34 in the axial direction. That is, with respect to the stator coil, the second magnetic circuit F2 shown in FIG. 1 is located on the inside. Due to the formation of the second magnetic circuit F2 between the annular magnetic conductive element 8 and the permanent magnet 20, a fixed magnetic attraction force can be further generated to the rotor 2 so as to prevent the rotor 2 from disengaging when it rotates, and the stability of the rotor 2 is improved.

In addition, taking the shaft 5 as a reference point, the position of the annular magnetic conductive element 8 on the circuit board 7 is closer to the shaft 5 than the position of the stator 3 on the circuit board 7. The second magnetic circuit F2 generated by the annular magnetic conductive element 8 and the permanent magnet 20 is axially projected on the permanent magnet 20.

Figure 7:
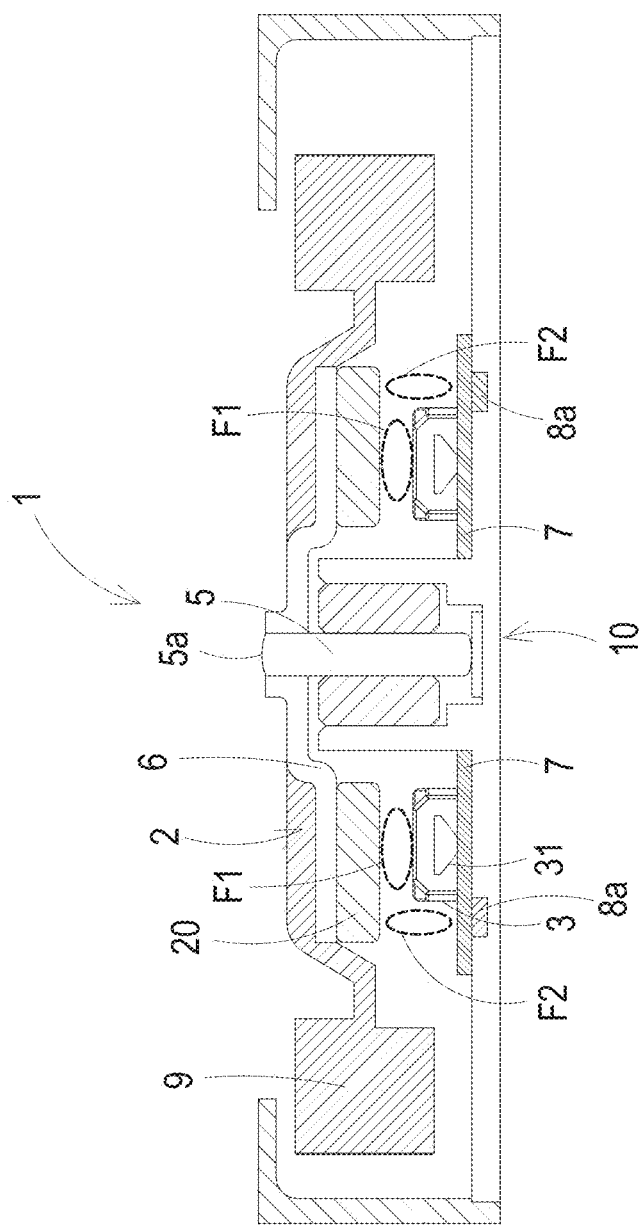
FIG. 7 is a schematic cross-sectional view illustrating a motor according to a second embodiment of the present disclosure.

FIG. 7 is a schematic cross-sectional view illustrating a motor according to a second embodiment of the present disclosure. The annular magnetic conductive element 8a shown in FIG. 7 is disposed between the circuit board 7 and the base 10. As shown in the FIG. 7, taking the shaft 5 as a reference point, the position of the annular magnetic conductive element 8a on the circuit board 7 is farther from the shaft 5 than the position of the stator 3 on the circuit board 7. The coils 31, 32, 33, and 34 are located between the shaft 5 and the second magnetic circuit F2 in the axial direction. That is, with respect to the stator coil, the second magnetic circuit F2 shown in FIG. 7 is located outside the stator coil. The second magnetic circuit F2 generated by the annular magnetic conductive element 8a and the permanent magnet 20 is axially projected on the permanent magnet 20. The second magnetic circuit F2 generates a fixed magnetic attraction force to the rotor 2. Therefore, the disengagement of rotor 2 when rotating is avoided, and the stability is improved.

Figure 8:
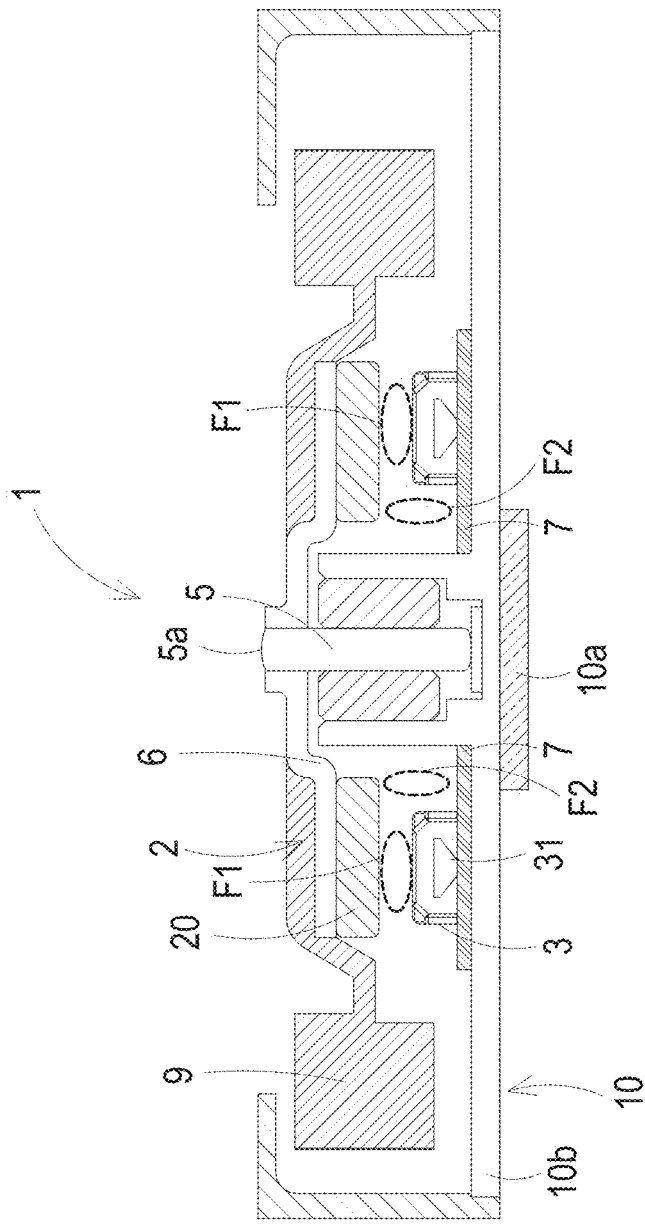
FIG. 8 is a schematic cross-sectional view illustrating a motor according to a third embodiment of the present disclosure.

FIG. 8 is a schematic cross-sectional view illustrating a motor according to a third embodiment of the present disclosure. The motor 1 shown in FIG. 8 is similar to that shown in FIG. 1, except that the base 10 of the motor 1 in FIG. 8 includes a magnetic conductive portion 10a and a non-magnetic conductive portion 10b. The magnetic conductive portion 10a is disposed on the bottom of the non-magnetic conductive portion 10b. That is, the magnetic conductive portion 10a and the non-magnetic conductive portion 10b are disposed on different planes. At least part of the magnetic conductive portion 10a overlaps with the permanent magnet 20 in the axial direction. Therefore, an axial second magnetic circuit F2 generated between the magnetic conductive portion 10a and the permanent magnet 20 generates a fixed magnetic attraction force to the rotor and improves the stability of the rotor during rotation.

In the present disclosure, the positions of the magnetic conductive elements 8 and 8a are not limited to being disposed on the second side of the circuit board 7, the positions of the magnetic conductive elements 8 and 8a can also be disposed close and faced to the first side of the rotor 2. In other words, the magnetic conductive portion is adjacent to the circuit board 7, and an axial second magnetic circuit F2 is generated between the magnetic conductive portion and the permanent magnet 20.

Figure 9:
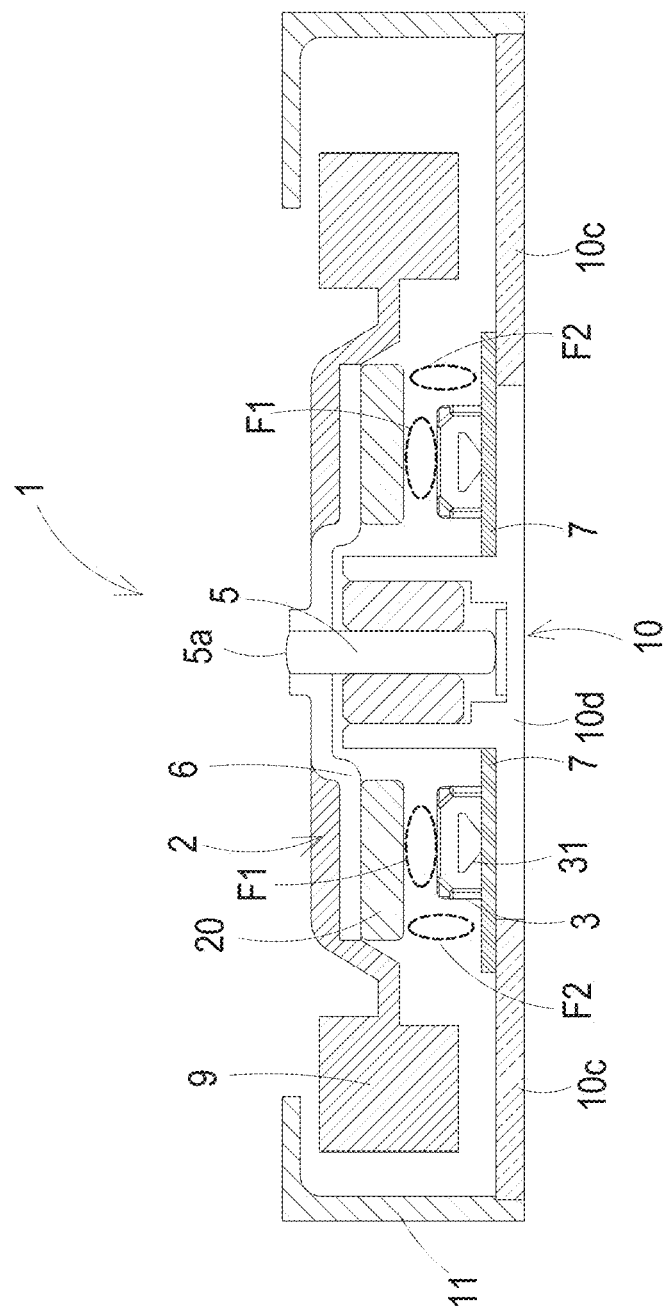
FIG. 9 is a schematic cross-sectional view illustrating a motor according to a fourth embodiment of the present disclosure.

FIG. 9 is a schematic cross-sectional view illustrating a motor according to a fourth embodiment of the present disclosure. As shown in FIG. 9, the base 10 of the motor 1 includes a magnetic conductive portion 10c and a non-magnetic conductive portion 10d. The magnetic conductive portion 10c and the non-magnetic conductive portion 10d are disposed on the same plane. The magnetic conductive portion 10c is disposed on the outside with respect to the non-magnetic conductive portion 10d in the axial direction. That is, the magnetic conductive portion 10c is far away from the shaft 5. At least part of the magnetic conductive portion 10c overlaps with the permanent magnet 20 in the axial direction so as to achieve the effect of the annular magnetic conductive element 8a shown in FIG. 7. That is, an axial second magnetic circuit F2 is generated between the magnetic conductive portion 10c and the permanent magnet 20, which generates a fixed magnetic attraction force to the rotor 2 and improves the stability of the rotor 2 during rotation.

Figure 10:
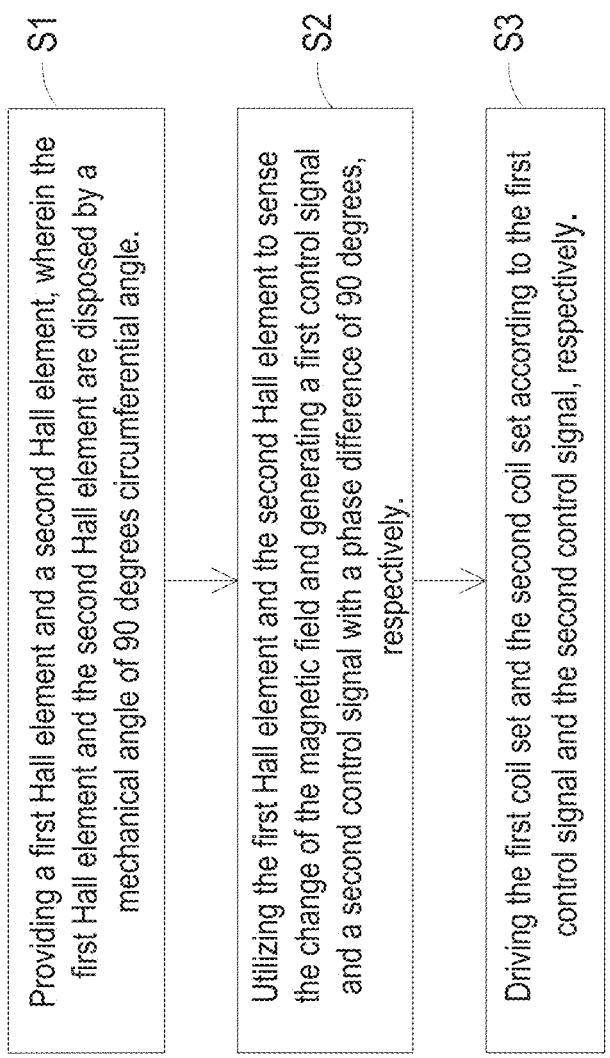
FIG. 10 is a flow chart illustrating a control method of a motor according to a first embodiment of the present disclosure.

FIG. 10 is a flow chart illustrating a control method of a motor according to a first embodiment of the present disclosure. The control method of the motor of this embodiment is applicable to the motor 1 in the above embodiments. The control method of the motor includes following steps.

In step S1, a first Hall element 41a and a second Hall element 41b are provided. The first Hall element 41a and the second Hall element 41b are disposed by a mechanical angle of 90 degrees Circumferential angle.

In step S2, the first Hall element 41a and the second Hall element 41b sense the change of the magnetic field generated by the permanent magnet 20 and generate a first control signal and a second control signal with a phase difference of 90 degrees, respectively.

In step S3, the first coil set T1 is driven according to the first control signal, and the second coil set T2 is driven according to the second control signal.

Figure 11:
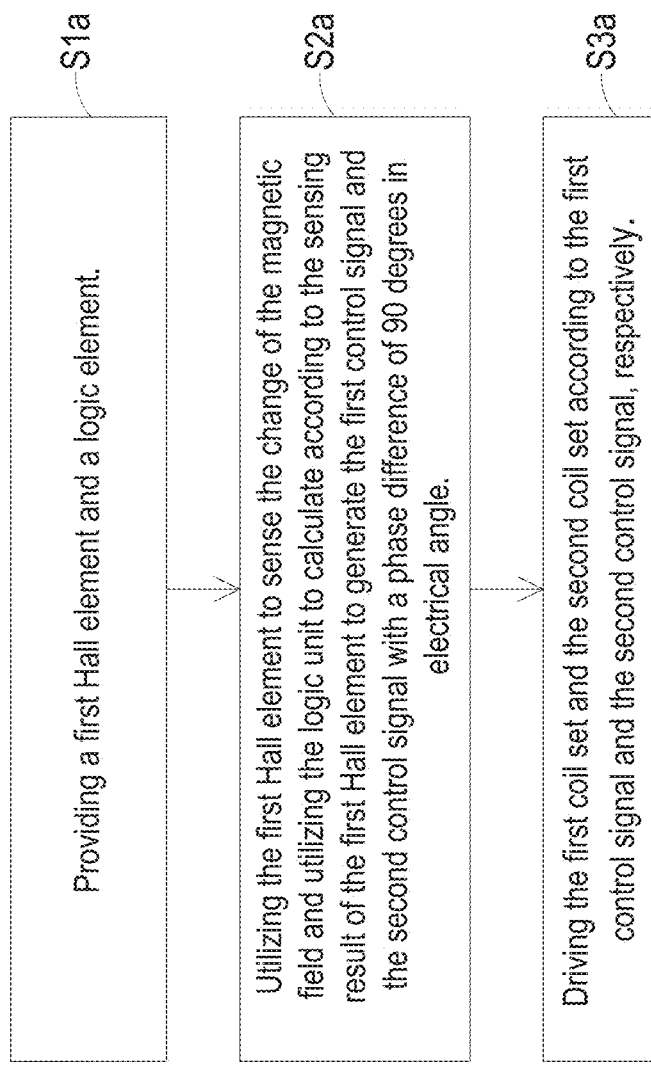
FIG. 11 is a flow chart illustrating a control method of a motor according to a second embodiment of the present disclosure.

FIG. 11 is a flow chart illustrating a control method of a motor according to a second embodiment of the present disclosure. The control method of the motor of this embodiment is applicable to the motor 1 in the above embodiments. The control method of the motor includes following steps.

In step S1a, a first Hall element 41a and a logic unit 44 are provided.

In step S2a, the first Hall element 41a senses the change of the magnetic field generated by the permanent magnet 20, and the logic unit 44 calculates according to the sensing result of the Hall element 41a to generate the first control signal and the second control signal with a phase difference of 90 degrees in electrical angle.

In step S3a, the first coil set T1 is driven according to the first control signal, the second coil set T2 is driven according to the second control signal.

From the above description, the present disclosure provides a motor. The motor is driven by two phase. That is, the motor 1 of the present disclosure controls the first driving unit and the second driving unit according to the first control signal and the second control signal respectively, so as to drive the first and second coil sets of the stator, respectively. The first control signal and the second control signal have a phase difference of 90 degrees in electrical angle. In addition, since each of the first and second poles of the permanent magnet of the rotor of the motor of the present disclosure occupies a mechanical angle of 360/2n degrees of the permanent magnet, and the four sets of the coils of the stator occupy a mechanical angle of 360/2m degrees of the stator, and any two sets of the coils adjacent to each other are separated by a mechanical angle of 90–(360/2m) degrees, and wherein n is 3 and m is 3, or n is 1 and m is 2. Compared with the conventional 8-pole and 4-slot motor, the space utilization rate of the motor 1 is increased, and the efficiency is improved correspondingly.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor comprising:
a rotor comprising a permanent magnet, wherein the permanent magnet comprises n first poles and m second poles, the first and second poles have different polarities and are staggered with each other, each of the first and second poles occupies a mechanical angle of 360/2n degrees of the permanent magnet, respectively, and n is 1 or 3;
a stator having four sets of coils, wherein a winding shaft of the four sets of the coils is axial relative to a shaft of the rotor, each set of the coils occupies a mechanical angle of 360/2m degrees of the stator, any two sets of the coils adjacent to each other are separated by a mechanical angle of 90–(360/2m) degrees, and m is 3 or 2, wherein m corresponds to 2 when n is 1, and m corresponds to 3 when n is 3,
wherein two of the four sets of the coils are disposed relative to a center of the stator to form a first coil set, the other two of the four sets of the coils are disposed relative to the center of the stator to form a second coil set; and
a driving element comprising a first Hall element, a second Hall element, a first driving unit and a second driving unit, wherein the first and second Hall elements are configured to sense the change of the magnetic field generated by the passage of the permanent magnet, the first driving unit drives the first coil set according to a first control signal, the second driving unit drives the second coil set according to a second control signal, and the first and second control signals are generated according to the sensing results of the first and second Hall elements, respectively, and the phase difference between the first and second control signals is 90 degrees in electrical angle;
wherein the first Hall element is electrically connected to the first driving unit, and the second Hall element is electrically connected to the second driving unit, the first driving unit and the first Hall element are integrated into a first integrated circuit, and the second driving unit and the second Hall element are integrated into a second integrated circuit.

2. The motor according to claim 1, wherein a first extension line is formed by passing through a midpoint of any coil of the first coil set and the center of the stator, a second extension line is formed by passing through a midpoint of any coil of the second coil set and the center of the stator, and the angle between the first and second extension lines is a mechanical angle of 90 degrees.

3. The motor according to claim 1, wherein the first and second Hall elements are disposed by a mechanical angle of 90 degrees Circumferential angle.

4. A motor comprising:

a rotor comprising a permanent magnet, wherein the permanent magnet comprises n first poles and m second poles, the first and second poles have different polarities and are staggered with each other, each of the first and second poles occupies a mechanical angle of $360/2n$ degrees of the permanent magnet, respectively, and n is 1 or 3;

a stator having four sets of coils, wherein a winding shaft of the four sets of the coils is axial relative to a shaft of the rotor, each set of the coils occupies a mechanical angle of $360/2m$ degrees of the stator, any two sets of the coils adjacent to each other are separated by a mechanical angle of $90-(360/2m)$ degrees, and m is 3 or 2, wherein m corresponds to 2 when n is 1, and m corresponds to 3 when n is 3, wherein two of the four sets of the coils are disposed relative to a center of the stator to form a first coil set, the other two of the four sets of the coils are disposed relative to the center of the stator to form a second coil set; and a driving element comprising a Hall element, a logic unit, a first driving unit and a second driving unit, wherein the Hall element is disposed on any one of the four sets of the coils, the Hall element is configured to sense the change of the magnetic field generated by the passage of the permanent magnet, the logic unit calculates according to the sensing result of the Hall element to generate a first control signal and a second control signal with a phase difference of 90 degrees in electrical angle, and the first and second driving units drive the first and second coil sets according to the first and second control signals, respectively;

wherein the driving element further comprises an integrated circuit, wherein the Hall element, the logic unit, the first driving unit and the second driving unit are integrated into the integrated circuit.

\* \* \* \* \*